United States Patent [19]

Sugiyama et al.

[11] Patent Number: 4,660,530
[45] Date of Patent: Apr. 28, 1987

[54] INTAKE SYSTEM FOR INTERNAL COMBUSTION ENGINE

[75] Inventors: Keiichi Sugiyama, Shizuoka; Takahiro Nagura, Iwata, both of Japan

[73] Assignee: Yamaha Hatsudoki Kabushiki Kaisha, Iwata, Japan

[21] Appl. No.: 835,530

[22] Filed: Mar. 3, 1986

[30] Foreign Application Priority Data

Mar. 4, 1985 [JP] Japan ................................ 60/42331
Mar. 4, 1985 [JP] Japan ................................ 60-42332

[51] Int. Cl.4 .............................................. F02B 15/00
[52] U.S. Cl. ............................. 123/432; 123/52 MB; 123/308
[58] Field of Search ................ 123/432, 308, 52 MB

[56] References Cited

U.S. PATENT DOCUMENTS 4,550,700  11/1985  Yoshida et al. ...................... 123/432
4,576,131   3/1986  Sugiyama ............................ 123/432

Primary Examiner—E. Rollins Cross
Attorney, Agent, or Firm—Ernest A. Beutler

[57] ABSTRACT

An induction system for an internal combustion engine that improves mid range torque without sacrificing low speed running or high speed performance. Each cylinder of the engine is served by two intake ports that are, in turn, served by respective intake passages that have a common portion. A first throttle valve is positioned in the common portion for precluding the back flow of exhaust gases and for controlling the flow to the chamber. In addition, first and second inlet passages discharge into the common intake passage and a throttle valve is positioned in one of those inlet passages.

19 Claims, 5 Drawing Figures

INTAKE SYSTEM FOR INTERNAL COMBUSTION ENGINE

BACKGROUND OF THE INVENTION

This invention relates to an intake system for an internal combustion engine and more particularly to an improved engine induction system that improves performance throughout the engine speed and load ranges.

It is well known that the design of an engine induction system represents a compromise between good running at low and medium engine speeds and maximum performance. In order to achieve good running at low and medium speeds, a relatively small induction system is desirable so as to provide high gas flow velocities into the combustion chamber to increase turbulence and improve flame propagation. On the other hand, an engine that is designed to achieve high maximum outputs has a relatively large effective cross-sectional area induction system so as to insure maximum air breathing at wide open throttle conditions. In order to try to obtain the advantages of both systems, it has been proposed to provide an engine induction system that includes at least a pair of intake passages that serve each chamber of the engine. The flow through one of these passages is throttled or substantially restricted at low and medium engine speeds so as to provide a relatively small effective cross-sectional area. The throttling is diminished at high engine speeds so as to achieve maximum power output. Although this arrangement has certain advantages, it has not provided an optimum torque curve throughout the entire engine load and speed ranges as is desired.

It is, therefore, a principal object of this invention to provide an improved induction system for an internal combustion engine.

It is another object of this invention to provide an engine induction system that will improve the torque curve throughout the entire engine running conditions and particularly at mid ranges.

In connection with high performance engines, it is the practice to provide a substantial overlap between the opening of the intake valve and the closing of the exhaust valve. This insures good breathing and good scavenging at high speed but presents considerable problems in connection with low speed running. Because of the wide overlap, the exhaust gases tend to flow back into the intake passage and thus weaken the next inducted fuel/air charge.

It is, therefore, a still further object of this invention to provide an improved induction system that will preclude against this condition while at the same time permit the use of overlapping valve timing.

SUMMARY OF THE INVENTION

A first feature of the invention is adapted to be embodied in an induction system for an internal combustion engine having a variable volume chamber comprising a first intake port serving the chamber, a second intake port serving the chamber and first and second intake passages serving the first and second intake ports. A common intake passage portion communicates at its downstream end with the first and second intake passages. A throttle valve is provided for controlling the flow through the common intake passage portion. First and second inlet passages communicate at their downstream ends with the common intake passage portion. A second throttle valve controls the flow through the first inlet passage.

Another feature of the invention is adapted to be embodied in an internal combustion engine having a variable volume chamber. Exhaust port means communicate with the chamber for flow of exhaust gases from the chamber. Exhaust control means control the flow of exhaust gases from the chamber into the exhaust port means. First and second intake port means serve the chamber for flow of an intake charge into the chamber through the first and second intake port means. Intake control means control the flow into the chamber through the first and second intake port means. The exhaust control means and the intake control means are timed during a cycle of operation to provide a substantial overlap period when both the intake port means and the exhaust port means communicate with the chamber and throttle valve means other than the exhaust control means and the intake control means are provided for restricting the flow through either the intake port means or the exhaust port means for resisting the flow through one port means during at least certain running conditions for restricting the effect of overlap of said control means.

DETAILED DESCRIPTION OF THE PREFERRED EMBODIMENTS

Figure 1:
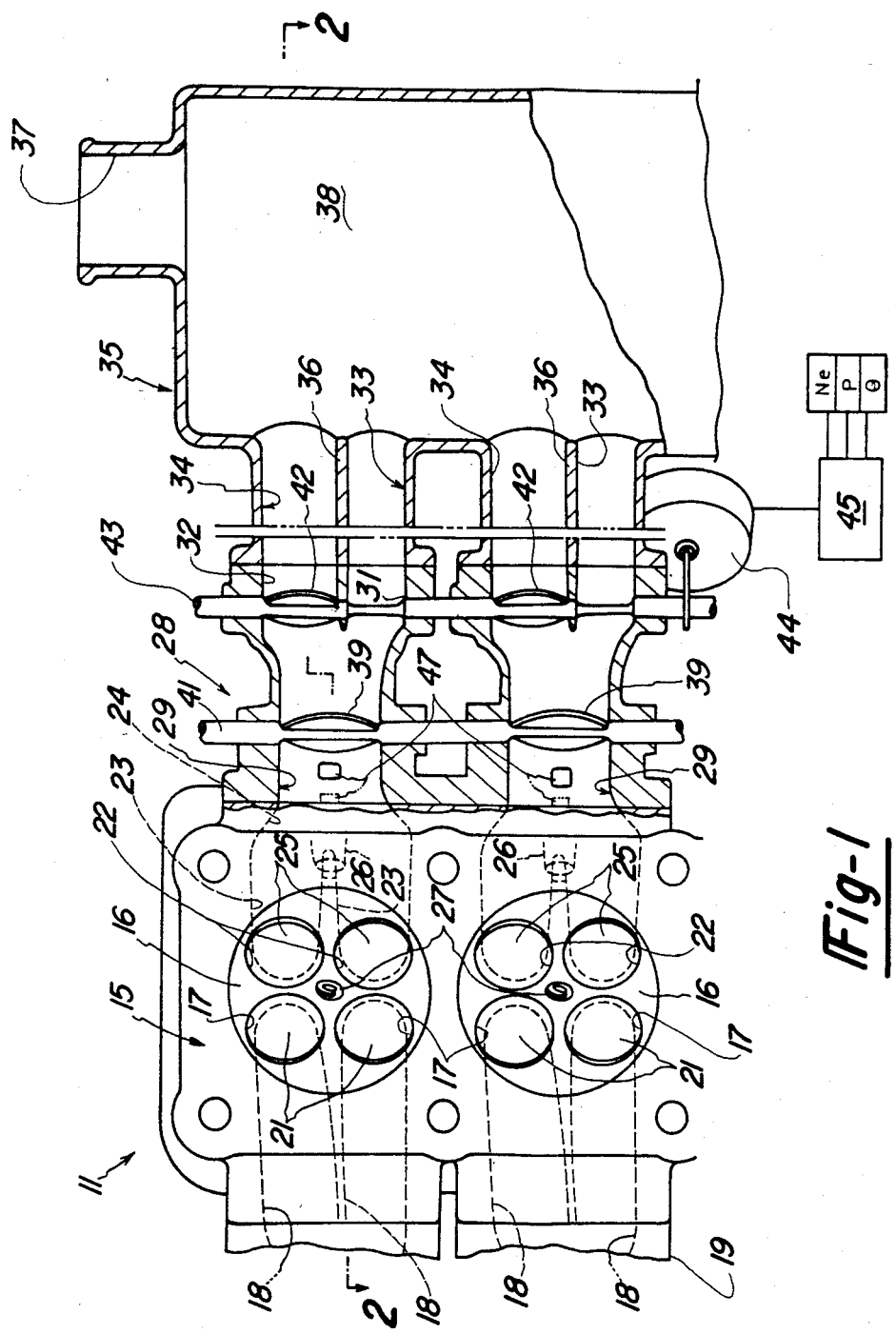
FIG. 1 is a bottom plan view, with portions broken away, of the cylinder head and intake manifold of an internal combustion engine constructed in accordance with an embodiment of the invention and looking generally in the direction of the line 1—1 in FIG. 2.

A multiple cylinder internal combustion engine constructed in accordance with an embodiment of the invention is identified generally by the reference numeral 11. In the illustrated embodiment, the engine 11 is of the inline, multiple cylinder type. It is to be understood, however, that this invention may be practiced with single cylinder engines and multiple cylinder engines of other than inline configuration. The applications of the principle of this invention to such other engine configurations will be readily apparent to those skilled in the art from the following description.

The engine 11 includes a cylinder block 12 in which cylinder bores 13 are formed. Pistons 14 reciprocate within the cylinder bores 13 and are connected in a known manner to drive a crankshaft (not shown).

A cylinder head assembly, indicated generally by the reference numeral 15, is affixed in a known manner to the cylinder block 12. The cylinder head 15 is provided with cavities 16 that cooperate with the pistons 14 and cylinder bores 13 to provide chambers having a volume that varies during each cycle of reciprocation of the piston 14 in a known manner.

A pair of exhaust ports 17 are formed in the cylinder head 15 on one side of the plane containing the cylinder bore axis. The exhaust ports 17 are formed at the termination of exhaust passages 18 that extend through the cylinder head 15 and which terminate in a flange to which an exhaust manifold 19 is attached for discharge of the exhaust gases to the atmosphere through a suitable exhaust system (not shown). The flow of exhaust gases from the chambers 16 into the exhaust ports 17 and exhaust passages 18 is controlled by means of exhaust valves 21 that are slidably supported within valve guides of the cylinder head 15 and which are operated in any known manner, such as by an overhead camshaft.

A pair of intake ports 22 are formed in the cylinder head 15 on the opposite side of the aforementioned plane containing the cylinder bore axis opposite from the intake ports 17. The intake ports 22 cooperate with pairs of intake passages 23 that are formed in the cylinder head 15 on the side opposite to the exhaust passages 18. At their inlet ends, the intake passages 23 merge into a common intake passage portion 24. Intake valves 25 are supported within the cylinder head 15 by means of valve guides and are operated in a known manner, as by an overhead mounted camshaft (not shown).

Fuel injection nozzles 26 are supported within the cylinder head and discharge into the area where the intake passages 23 diverge from the common portion 24. In this manner, the discharge from the nozzles 26 will impinge upon the dividing wall and insure good distribution between both intake ports 22.

A spark plug 27 is positioned centrally in the chamber 16 and is fired in a known manner for burning the charge delivered to the combustion chamber through the intake ports 22.

An intake manifold, indicated generally by the reference numeral 28, is attached to the intake side of the cylinder head 15 and has intake passage portions 29 which are aligned with and mate with the common intake passage portions 24 of the cylinder head. Upstream of the common intake manifold portions 29, there are provided first and second inlet passages 31 and 32, respectively. The inlet passages 31 and 32 mate at their inlet ends with corresponding passages 33 and 34 formed by an air inlet device 35. A dividing wall 36 separates the passage portions 33 and 34, and 31 and 32 from each other.

The inlet device 35 has an atmospheric air inlet opening 37 and defines a plenum chamber 38 so as to provide an adequate and equal air supply to each of the passages 33 and 34.

The flow to the chambers 16 is controlled by means of first throttle valves 39 which are positioned within the intake manifold common passage portion 29 upon a throttle valve shaft 41. In addition, the flow through the upstream inlet passage portions 34 is controlled by means of throttle valves 42 that are affixed to a second throttle valve shaft 43 which is also rotatably journaled within the intake manifold 28. The throttle valves 39 are manually actuated by an operator controlled throttle control mechanism which may be of any known type. The throttle valves 42 are, on the other hand, automatically operated by means of a vacuum motor 44 under the control of a controller 45 that receives a plurality of inlet control signals responsive to certain parameters of the engine. In the illustrated embodiment, these parameters are engine speed (Ne), intake manifold pressure (P) and angle of opening of the throttle valves 39 ($\theta$). It is to be understood, however, that other parameters may be chosen.

Figure 2:
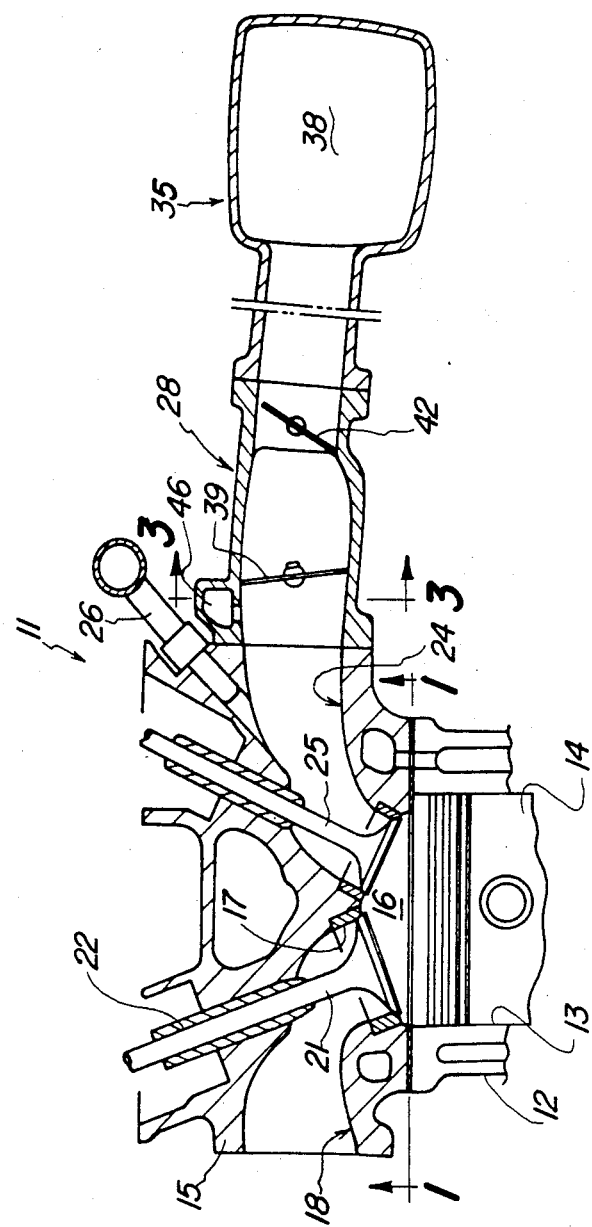
FIG. 2 is a partial cross-sectional view taken through a single cylinder of a multiple cylinder internal combustion engine constructed in accordance with the embodiment of the invention and taken along the line 2—2 of FIG. 1.
Figure 3:
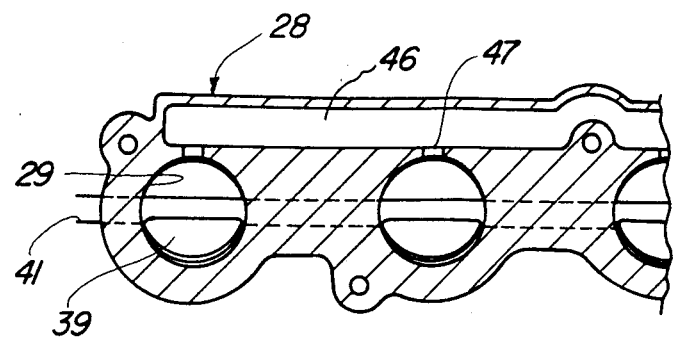
FIG. 3 is a cross-sectional view taken along the line 3—3 of FIG. 2.

The balance passage 46 is formed in the intake manifold 28 and extends adjacent to the intake manifold common intake passage portions 29. The balance passage 46 is formed with openings 47 that open into each of the manifold portions 29. In FIGS. 1 and 2, the location of the openings 47 is depicted as being upstream from the mating face between the manifold 28 and the cylinder head 15. It is to be understood, however, that the passages 47 and balance passage 46 may be formed directly in the face of the intake manifold 28 that mates with the cylinder head 15 so as to make casting possible without using a core. Such an alternative location is shown in the dotted line view in FIG. 1.

The operation of the embodiment will now be described. During idle operation, the manually positioned throttle valves 39 will be positioned in a substantially fully closed position as will the automatically operated throttle valves 42. Under this condition, there will still be a relatively high velocity of air flow through the induction system since the effective cross-sectional area is substantially reduced. In addition, even though there is substantial overlap between the opening of the intake valves 25 and the closing of the exhaust valves 21 (as much as 40° of crankshaft rotation and, preferably, in the range of 35° to 40°), the exhaust gases will not back flow through the induction system due to the close positioning of the throttle valves 39 to the intake ports 22. Thus, there cannot be any substantial flow of exhaust gases back into the induction system so as to dilute the next inducted mixture. In addition, under this running condition, a substantial portion of the intake charge will be supplied from the balance passage 46 and passages 47 so as to insure a high velocity of flow. One cylinder will induct its intake charge from the area of another cylinder not on the intake cycle between the throttle valve 39 and the intake valves 25 so as to insure such high velocity, which increases turbulence in the combustion chamber, improves flame propagation and thus improves low speed running.

As the throttle valves 39 are continued to open by manual operation, the throttle valves 42 are still held in their closed position so that the induction system has a relatively small effective cross-sectional area. This is assured even when the throttle valves 39 are fully opened, if the throttle valves 42 are closed. Under this condition, the effective cross-sectional area will be that of the intake passages 33 so as to still insure high velocity flow. At some time before full opening of the manually operated throttle valve 39, however, the throttle valves 42 begin their opening under the automatic control of the actuator 44 so as insure a good torque curve while at the same time achieving maximum power output.

Figure 4:
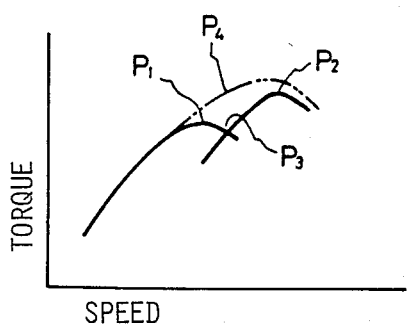
FIGS. 4 and 5 are torque curves showing the principles of the invention.
Figure 5:
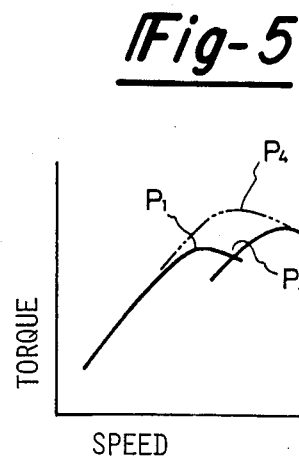

FIGS. 4 and 5 illustrate how the illustrated embodiment and the principle of the invention permits an improved performance, particularly in the mid range, without adversely affecting either low speed running or maximum power output. FIG. 4 shows an embodiment wherein the exhaust timing and valve overlap is chosen so as to increase maximum power output while the embodiment of FIG. 5 shows how the exhaust timing and valve overlap may be utilized to improve mid range torque without adversely affecting maximum power output. In each embodiment, the curve $P_1$ shows the torque curve for the engine if the throttle valves 42 are maintained in a fully closed position. The curve $P_2$ represents the torque curve that would be generated by the engine if the engine were operated with the throttle valve 42 held in a fully opened condition. It will be seen that with the throttle valve 42 held fully closed, the torque curve rises and peaks at a relatively low engine speed. The reason for this is that the induction system has a very small effective cross-sectional area and, although low engine speed performance is good, there is a substantial reduction in total power output. On the other hand, when the throttle valves 42 are held fully opened, the torque curve is extremely poor at low speeds although a relatively high maximum power output will occur. It will also be seen from the shape of these two curves that if the throttle valves 42 are held closed until past the speed at which the torque falls off due to the opening of the throttle valves 39, that there will be a dip in the torque curve at mid range performance which is not acceptable. Hence, it is desirable to open the throttle valves 42 prior to full opening of the throttle valves 39 so that the torque curve will follow the curve $P_4$ shown in the two figures.

The difference between FIG. 4 and FIG. 5 has to do with the valve overlap that is chosen so as to achieve maximum power output and also to tailor the torque curve. FIG. 4 shows an engine that develops maximum power at a high engine speed and this is achieved due to large exhaust valve inlet valve overlap. In FIG. 5, on the other hand, a lesser degree of overlap is employed so that mid range torque will be higher but maximum power output may be lower. Various arrangements may be employed for tuning the exhaust and obtaining the desired torque curve for a specific application in light of the foregoing teaching.

It should be readily apparent that the foregoing description is that of preferred embodiments of the invention and that various changes and modifications may be made without departing from the spirit and scope of the invention, as defined by the appended claims.

We claim:

1. An induction system for an internal combustion engine having a variable volume chamber comprising a first intake port serving said chamber, a second intake port serving said chamber, a first intake passage serving said first intake port, a second intake passage serving said second intake port, a common intake passage portion communicating at its downstream end with said first and said second intake passages, a throttle valve for controlling the flow through said common intake passage portion, a first inlet passage communicating at its downstream end with said common intake passage portion, a second inlet passage communicating at its downstream end with said common inlet passage portion, and a second throttle valve for controlling the flow through said first inlet passage.

2. An induction system as set forth in claim 1 wherein there are a multiplicity of chambers each served by intake and inlet passages as described.

3. An induction system as set forth in claim 2 further including balance passage means interconnecting the intake passages of the chambers with each other.

4. An induction system as set forth in claim 3 wherein the balance passages communicate with the chambers with each other downstream of the first throttle valves.

5. An induction system as set forth in claim 4 further including a charge forming device for delivering a charge to the first and second intake passages downstream of the first throttle valves.

6. An induction system as set forth in claim 5 wherein the charge forming device comprises a fuel injection nozzle.

7. An induction system as set forth in claim 1 wherein the first throttle valves are operated manually and the second throttle valves are operated automatically.

8. An induction system as set forth in claim 7 wherein the second throttle valves are operated in response to the load on the engine.

9. An induction system as set forth in claim 1 wherein the variable volume chamber and first and second intake ports are formed by a cylinder head, the common intake passage portion and the first and second inlet passages being formed by an intake manifold affixed to the cylinder head.

10. An induction system as set forth in claim 9 wherein there are a multiplicity of chambers each served by intake and inlet passages as described.

11. An induction system as set forth in claim 10 further including balance passage means interconnecting the intake passages of the chambers with each other.

12. An induction system as set forth in claim 11 wherein the balance passage is formed in the intake manifold.

13. An induction system as set forth in claim 12 wherein the balance passage is formed in the face of the intake manifold and mates with a corresponding face of the cylinder head so that the cylinder head face forms a closure for the balance passage.

14. An induction system as set forth in claim 1 further including an exhaust port communicating with the chamber, poppet valves for controlling the flow through said exhaust ports and said intake ports and means for operating said poppet valves to provide a substantial overlap between the opening of the intake ports and the closing of the exhaust port.

15. An induction system as set forth in claim 14 wherein the first throttle valves are positioned in close proximity to the intake ports for precluding the back flow of exhaust gases under low speed running.

16. An internal combustion engine having a variable volume chamber, exhaust port means serving said chamber for flow of exhaust gases from said chamber, exhaust control means for controlling the flow of exhaust gases from said chamber into said exhaust port means, first and second intake port means for serving said chamber for flow of an intake charge into said chamber through said first and second intake port means, intake control means for controlling the flow into said chamber through said first and second intake port means, wherein there are provided first and second intake passages each of which terminates in a respective intake port serving the chamber and comprising the first and second intake port means, said intake passage means having a common portion upstream of said first and said second intake passages said exhaust control means and said intake control means being timed during a cycle of operation to provide a substantial overlap period when said intake port means and said exhaust port means both communicate with said chamber, and throttle valve means other than said exhaust control means and said intake control means for restricting the flow through one of said intake port means and said exhaust port means for resisting the flow through said one port means during at least certain running conditions for restricting the effect of overlap.

17. An internal combustion engine as set forth in claim 16 wherein the throttle valve means is positioned for controlling the flow through the intake port means.

18. An internal combustion engine as set forth in claim 17 wherein the throttle valve means is positioned closely adjacent where the intake port means communicates with the chamber.

19. An internal combustion engine as set forth in claim 16 wherein the throttle valve means comprises a single throttle valve positioned in the common portion of the intake passages.

* * * * *